W. P. BOVARD.
AUTOMATIC CAR AIR AND ELECTRIC COUPLING MECHANISM.
APPLICATION FILED JAN. 11, 1915.

1,281,495.

Patented Oct. 15, 1918.
3 SHEETS—SHEET 1.

Fig. 1

Witnesses:
L. B. Graham
Kent N. Wonnell

Inventor:
W. P. Bovard,
By Brown Nissen & Hinkle
Attys.

UNITED STATES PATENT OFFICE.

WILLIAM P. BOVARD, OF MANSFIELD, OHIO, ASSIGNOR TO THE OHIO BRASS COMPANY, OF MANSFIELD, OHIO, A CORPORATION OF NEW JERSEY.

AUTOMATIC CAR AIR AND ELECTRIC COUPLING MECHANISM.

1,281,495.        Specification of Letters Patent.        Patented Oct. 15, 1918.

Application filed January 11, 1915.   Serial No. 1,563.

*To all whom it may concern:*

Be it known that I, WILLIAM P. BOVARD, a citizen of the United States, residing at Mansfield, in the county of Richland and State of Ohio, have invented certain new and useful Improvements in Automatic Car Air and Electric Coupling Mechanisms, of which the following is a specification.

The invention relates to an improved car coupling system designed to be automatically operated in so far as the mechanical car coupling device is concerned, and in which the usual air and electrical connections are also automatically coupled and uncoupled on the manipulation by a trainman of certain valves and switches in the cab of one of the cars, or from a position on the ground adjacent either car.

The primary object of the invention is to provide certain improvements as hereinafter described in car air and electric coupling devices and in the means for controlling the same.

In the drawings which are directed to the preferred embodiment of the invention.

Figure 1:
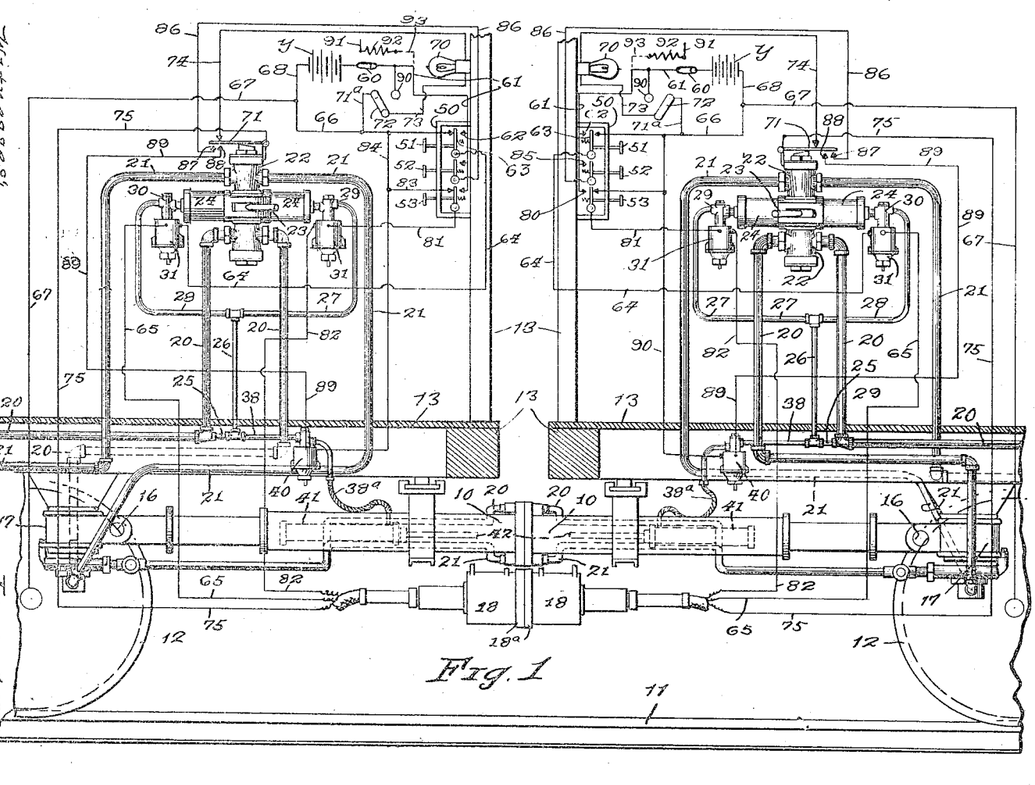
Figure 1 is a side elevation of two coöperating coupling devices shown on cars the adjacent ends of which are shown in side elevation with the car bodies in section, disclosing in side elevation the coupling mechanisms on the interior and exterior of the car bodies or the trainmen's cabs, with the exception of the fluid and electrical connections which are diagrammatically illustrated. In this view broken portions of the car trucks and track also appear.
Figure 3:
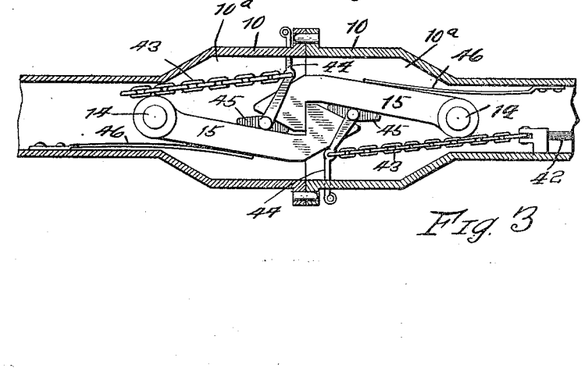
Fig. 3 is a horizontal longitudinal view through the casing of the car coupling devices, showing the details of the construction on the interior thereof.

In Fig. 1 the general arrangement of the invention as applied to two cars in coupling relation is best illustrated, and in this view and throughout the drawings like reference characters are used to designate like parts. As is well-known, coupling devices for mechanically coupling cars together and for coupling or connecting the ends of fluid connections, and for connecting electrical circuits between different cars are employed on the ends of cars adapted to be coupled together in trains of two or more cars, and the successful operation of such devices depends upon each of two or more cars being equipped with like or similar devices for coöperating with each other in the coupling relation. Therefore, in Fig. 1 as well as in Figs. 3, 4 and 5, portions of similar coupling devices on two contiguous cars are shown, and while this manner of showing the invention obviously results in a duplication of some of the parts, it will be seen that the same reference characters are applied to the same parts although they appear as a part of the coupling devices of different cars. For example, in Figs. 1 and 3 casings of the coupler heads or drawbars in each of the cars are indicated generally by the reference character 10. Only such portions of the cars as are necessary to illustrate the construction and mode of attachment of the coupling devices are shown, and it will be seen that one rail of the track supporting the cars is designated by the reference character 11, the wheels or trucks of the cars by 12, and such portions of the car frame as are shown, by the reference character 13. The coupler heads 10 may be of any desired construction but are preferably of the form shown in Figs. 1 and 3, their forward ends being provided with the usual faces and hollow interiors as indicated at 10ª in which are pivotally mounted at 14 the usual coupler hooks 15 having coöperating hook projections extending beyond the forward faces of the coupler heads. The coupler bars 10 are suitably connected to the under portions of the cars as shown in Fig. 1 by the universal pivotal connections on both horizontal and vertical axes as at 16 and 17 (Fig. 1).

I make no claim to the specific form of car coupler device herein shown and described, the same being shown and described in the application of Charles H. Tomlinson, Serial No. 822,802 of March 6, 1914, to which reference may be had for a more complete description of the details of not only the car coupler device, but the details of the electrical coupler herein generally shown may also be seen in detail in the said Tomlinson application; and no claim to the details of the electrical couplers *per se* is made by me. In Fig. 1, however, is shown the outline of casings designated by the reference character 18, each having coöperating coupling faces as indicated at 18ª and adjacent the interiors of these faces it will be understood that coupler contacts are provided for connecting the electrical circuits between the cars to be connected in the coupling relation. The coupler heads 18 for the electrical connections may be suitably supported below the car coupler heads 10 by any desired supporting means not herein shown as the same obviously forms no part of the present invention.

In addition to the use of the devices for mechanically coupling the cars together and for connecting various electrical circuits between two coupled cars, the system with which the present invention is concerned contemplates the provision of the usual reservoir line and brake line pipes commonly used in operating air brakes. The reservoir line and the brake line pipes are so termed for the reason that the former communicates between the reservoir or source of fluid pressure and the pressure control device, while the brake line extends from the pressure control devices to the brake cylinders or other brake operating devices.

In the drawing of Fig. 1, the reference character 20 designates the reservoir line and 21 the brake line. Interposed in both the reservoir line and the brake line, and controlling the passageways through the same, is the main controlling valve indicated generally by the reference character 22. Within the valve casings 22 are rotary valves adapted to move synchronously in opening and closing the passageways through the reservoir and brake lines 20 and 21 respectively in both of the cars. The valves in casings 22 are of the rotary type and are operated either by hand levers, as indicated by the reference character 23, or by air controlled pistons reciprocable within the casings 24 connected with the valve casing 22.

So much of the devices as have been previously described refer to details of the construction common to the coupling systems of C. H. Tomlinson as described in the said Tomlinson application and I make no claim herein to such structure, but I do claim the hereinafter described electrical control and signal system by which the main control valves of the reservoir line and brake line and the mechanical car coupler devices are placed under the positive control of an operator from a convenient position in either of two coöperating cars equipped with the invention and the operating devices herein described. A branch pipe 25 is taken from the reservoir line 20 between the main valve and the reservoir and leads through pipe 26 to two branches 27 and 28, which latter communicate with the opposite extremities of the casing 24 containing the plungers for operating the main valve. In the pipes 27 and 28 there are interposed valve casings 29, 30 containing valve mechanism shown in detail in Fig. 2. This valve mechanism is under the control of an electro-magnet contained in the casings which are designated generally by the reference character 31. The details of this electrically operated valve are shown and described in the said Tomlinson application and since their details of construction form no part of the present invention, it will be sufficient to observe that the passageway through the valve casing 30 (Fig. 2) is adapted to be closed by a spring pressed valve member 32 and that the valve 32 is under the control of an electrically operated plunger 33 and a reciprocating pin 34 interposed between the plunger 33 and the valve 32. Surrounding the plunger 33 is the field of an electro-magnet indicated generally by the reference character 35, and reciprocatory movement in the upward vertical direction may be imparted to the plunger 33 by means of the armature member 36 suitably secured to or coöperating with the lower extremity of the plunger. Should the electrical means provided for operating the valve 32 in the manner described fail for any reason to perform its function, a pin 37 is shown projecting through the lower end of the valve casing 31 by which the valve plunger 33 and the valve 32 may be opened by the hand of an operator pressing upwardly on said pin 37. While I have above described the electro-magnet device for operating the valves within the valve casings 30, it should be observed that the mechanism for operating the valves within the casings 29 is identical, and the valves 29 may be designated as the "off" valves or magnets and the valves 30 as the "on" valves or magnets, since the admission of air through the reservoir line, the branch 28, through valve 30 into the casing 24 will result in the movement of the main valve to the "on" position or the open position, permitting air to pass freely through the main valve and into both brake and reservoir lines 21 and 20 respectively between the main valve and the coupling devices. It should also be observed that the branch 25 has an extension indicated by the reference character 38, leading to the device for uncoupling the car coupling devices. Interposed in the branch line 38, a portion of which may be composed of a flexible tube as indicated at 38ᵃ, is an uncoupling electrically operated valve identical in construction and mode of operation with the electrically operated valves 29, 30. This valve is designated generally by the reference character 40 on both cars in Fig. 1. The branch line 38 through the flexible portion thereof 38ᵃ, connects directly with the interior of the car coupler cylinders designated by the reference character 41. The cylinders 41 are provided with pistons, not shown, connected with piston rods indicated by the reference character 42, Figs. 1 and 3. The construction of these cylinders is not shown in detail herein as the same forms no part of the present invention, and it will suffice to point out that the air pressure entering the cylinders 41 through the branch lines 38 and 38ᵃ will operate the piston rods 42 to exert a pull on the chains 43 shown in Fig. 3 and the levers 44 connected therewith, which will result in shifting the cams 45 controlling the coupler hooks 15 and will cause them to be separated against the action of the flat springs 46 which normally tend to force them into the coupling relation. After the piston rods 42 and the cylinders 41 are forced to the uncoupling position they may be returned to the normal position by any suitable means, no means for this purpose being herein shown, as these details form no part of the present invention. It may here be pointed out that the reservoir and brake lines 20 and 21 which enter the swivel connection at 17 of the coupler heads, find an outlet through pipes extending parallel with the coupler heads to the coöperating faces thereof where they terminate in suitable relation with the head to coöperate with their respective opposing lines on the opposite coupler head, thereby forming continuous parallel conduits for fluid pressure between the two cars.

Figure 2:
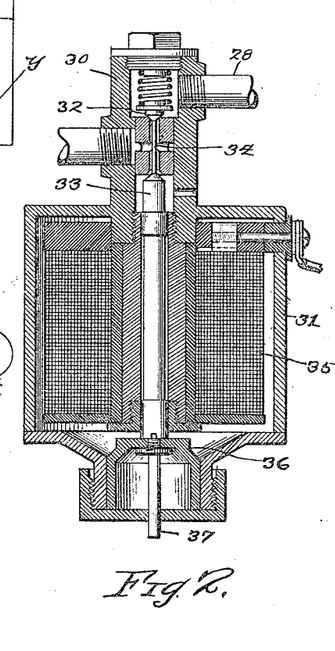
Fig. 2 is a vertical sectional view through one of the combined magnets and pilot valves for operating the main air control valves in the cars, and the uncoupling devices.

It is believed that the description of the remainder of my system will be best understood from a description of its mode of operation in the operations of coupling and uncoupling the cars each provided with coöperating portions of the system. The operation of coupling together two coöperating cars will be first described. Assuming that each of the cars, as for example the two portions of cars shown in Fig. 1, is provided with air pressure in its reservoir and brake lines, which pressure will extend through the pipe lines 20 and 21 from the interior of the car up to where such pressure will be broken by the main valves in casings 22, which valves will of course be in the closed position, the cars are then in condition to have their coupling devices brought into contiguous relation with the desired degree of force or pressure which will result in spreading the coupling devices 15 when their beveled forward projecting faces engage each other, and when the forward faces of the coupler heads are brought together in the manner indicated in Figs. 1 and 3, the cars and their coupling devices will then be in proper position to connect up the fluid pressure and electrical systems. This will be accomplished by the operator from his station adjacent a suitable control board containing the operating switches. Such control board is indicated generally by the reference character 50, Fig. 1, and in the embodiment of the invention shown, it comprises three push buttons indicated by the reference characters 51, 52, and 53 respectively; 51 designating what is hereinafter termed the "on" button or switch, 52 the "uncoupling" button or switch, and 53 the "off" button or switch. The cars being brought into the coupling relation, if the operator from his position in either car adjacent the switch board 50 presses the "on" button 51, he will close the electric circuit which operates the "on" magnet 31, the closed circuit energizing the coil 35 therein, as shown in Fig. 2, and causing the plunger therein to rise and open a valve in casing 30 corresponding to the valve 32 of Fig. 2, which will permit the pressure from the reservoir line 20 through branch 28 to enter the casing 24 behind the piston therein, which will result in operating the main valve in the casing 22 to the open position. This will result in establishing communication through the main valve between the interior lines of the brake and reservoir systems and the short portions thereof between the main valves 22 and the terminals of the lines 20 and 21 in the coupler heads. Assuming that when the cars were brought together air pressure was existing in only the reservoir and brake lines on one of the cars, it will be seen that the operation of the "on" button 51 of that car would result in energizing the "on" magnet 31 to open the valve 30 and shift the main valve in the casing 22, which would cause the pressure in both reservoir and brake lines to pass into their terminal extensions between the main valve and the coupler head. The pressure would pass thence into the reservoir and brake lines respectively on the companion car, following these lines throughout the length of the couplers, through their swivel connections, and thence to the main valve where each of these lines on the companion car would be open by reason of the fact that the main valve would be in the open position. The effect of pressing the "on" button 51, upon its coöperating electrical circuit, would be as follows; the current will pass from the battery designated by the reference character Y, through the closed switch 60, line 61, to contact 62, thence through switch arm 63 and line 64 to the "on" magnet 31, thence through line 65 which passes through the coupler casings 18 to the opposite side thereof, and up to the casing of the magnet 31 on the opposite car; thence through corresponding line 64 on the opposite car, to the open "on" switch 63 operated by the button 51 on that car, thence downward through lines 66 and 67 to ground; thence upward through line 67 on the opposite car and through the short line 68 directly into the battery Y, completing the circuit. Thus it will be seen that by pressing the "on" button 51 on the control board 50 in either of the cars, the battery Y in that car will be placed in circuit with the "on" magnets 31 for operating the main valves in both cars which will result in the shifting of both main valves immediately to the open position.

In a coupling system of the described character, it is very desirable that means be provided by which the operator, from his station on one of the cars, shall know that the main valves in both of the cars have operated to the open position after the "on" button has been pressed. Such a means is provided in the embodiment of the invention shown for example in Fig. 1, and consists of the electric signal lights 70 located in plain view of the operator at the control board 50 in each car. Pivoted switch levers are provided adjacent each of the main valves as designated by the reference character 71 (Fig. 1). These levers are pivotally mounted adjacent a protruding cam shaped extremity of the main valve which in the embodiment shown is in the rotary form and rotates approximately through an angle of 90° in passing from its open to its closed position. This movement of the main valve imparts a sufficient amount of movement to the switch levers 71 to cause them to contact alternately with the electrical contact points shown adjacent them as will be noted in tracing the signal circuit as follows; when the "on" button 51 in either car has been operated and after the main valves in the casings 22 in both cars have been operated to the open position, the switch levers 71 will be elevated and the circuits connected therewith and with the signal lamps 70 will be closed by the movement of the main valve and its effect upon the switches 71 so that the operator from his position in either one of the cars may ascertain whether or not the main valves have operated by noting whether or not the signal lamps 70 light upon shifting one of switches 72 in either car after the "on" button is pressed. If the valves in both cars properly move to the open position, the circuits connecting the lamps 70 with the batteries Y will be closed upon the operation of either switch 72 to contact 90 and may be traced as follows; either switch 72 would be thrown onto the contact 90 and the current would then travel from positive side of battery Y through line 61, switch 72, line 73, lamp 70, line 74, switch 71, line 75 through coupler to line 75 on opposite car, switch 71 in that car, line 74, lamp 70, line 73, switch 72, lines 71ª, 66 and 67 to ground, thence through line 67 in the first car and line 68 to negative side of battery Y, completing the circuit.

Obviously, if either of the main valves has failed to work, the switch levers 71 will not have been operated to their elevated position and the circuit above described will not have been closed and the lamps 70 will not light. This will be a sufficient warning to the operator from his position if either of the two cars attempted to be coupled together that although the cars are mechanically coupled the air and electric connections are not in proper condition for successful operation.

The uncoupling of two coöperating cars equipped with the invention is accomplished in the following manner; obviously to prevent loss of pressure in the air mains and to obviate the difficulty of opening the lines under direct pressure, it is desirable that the main valves shall be operated to the closed position before cars are mechanically uncoupled or separated. Provision is therefore made for first enabling the operator to shift the main valves to closed position by the following operation: From his station in either of the cars he will first press the off button designated by the reference character 53. This will shift the switch controlled by push button 53 and will close the battery circuit leading to the off magnet operating the valves in casing 29. This battery circuit may be traced as follows; from battery Y in one of the cars through closed switch 60, which will be closed at all times when the battery current is to be utilized for operating the magnets, thence through line 61 through the off switch terminal designated by the reference character 80; thence through off switch 53 and line 81 to the off magnet 31 operating the valve in casing 29; thence through line 82 to the electric coupler connection in the casing 18 and out through corresponding line 82 on the opposite car to the magnet operating valve 29 therein; thence through line 81 to the open off switch 53 which, being in the off or open position, is in circuit with line 83. The circuit is traced from line 83 through line 84, lines 66 and 67 to ground; thence through lines 67 and 68 on the opposite car to the battery Y, completing the circuit. It will be obvious that if the off switch button 53 on the opposite car be shifted in the same manner the off magnets in both cars will be energized through the closing of the corresponding circuit, just described, in the two cars with the result that the valves 29 in both cars will be opened, admitting air pressure from the reservoir line 20 through the branch 27 behind the pistons in the off casings 24 of the main valve which will result in the shifting of the main valve to the closed position, thus blocking the passage of the air within the reservoir and brake lines 20 and 21 in the contiguous ends of the two cars. When the main valves have been operated to the closed position the cam portions thereon coöperating with the switches 71 permit said switches 71 to drop, breaking the circuits heretofore described and placing the signal light 70 in broken circuit with the batteries Y, indicating to the operator that the main valves are closed.

The main valves having been operated to the closed position the cars are ready for the uncoupling operation which is accomplished from the cab of either of the cars as follows: By pressing either of the uncoupling switch buttons 52 the operator may throw the uncoupling magnets 40 in circuit with the battery, thus energizing these magnets and opening the valve controlling the branch air line 38 leading to the coupler operating cylinder 41. This circuit when the uncoupling switch button 52 is closed is as follows; assuming, of course, that the operator has first pressed the off button 52 and operated the main valve to the uncoupled position thus causing the switch 71 to drop and break the contact between them and the line 74. Leading from battery Y the current passes through closed switch 60 and line 61 to contact 85 of the uncoupling switch 52; thence through said switch and line 86 to terminal 87 of switch 71, which has previously dropped to a position owing to the closing of the main valve which places the terminal 88 of the line 89 in the circuit, the latter line leading to the uncoupling magnet designated generally by the reference character 40 (Fig. 1). It should be here observed that the magnet 40 is provided with a main operating valve stem, as indicated by the reference character 37 (Fig. 2) by which it may be operated independently of the electrical circuit by an operator positioned from the ground. From the armature of the magnet 40 the circuit leads through the line 90 and the lines 66 and 68 to the battery Y, completing the circuit. It will be noted that the uncoupling circuits do not pass through the electrical coupling between the two cars as do the on and off circuits. This is made possible by the peculiar construction of the Tomlinson coupler which may be operated to the uncoupled position of the uncoupling device in either car in the following manner: The energizing of the magnet 40 in either car will open the valve in the branch line 38 and admit reservoir line pressure to the coupler operating cylinder 41 which will operate the piston 42 (Fig. 3) away from the face of the coupler, causing it to exert a pull on the chain 43 and lever 45 causing the cam member to operate on the coupler hooks 15 in both cars or on both the companion couplers, separating them in the manner described in the said Tomlinson application and allowing the coupler devices to be freely disconnected.

From the above description it will be apparent that when the cars are in the coupled relation they may be uncoupled by the operator pressing the off button in either of the cars and upon the operation of the main valves to closed position his subsequent operation of the uncoupling buttons 52 to the closed position or his operation by hand of the uncoupling magnets 40 will result in operating the coupler hooks 15 to the uncoupled position. It will also be apparent that in my improved system a safety device is provided which will prevent the operation of the coupling devices to the uncoupled position prior to the closing of the reservoir and brake lines for should the operator overlook pressing the off button 53 to close the main valves it will be apparent that he cannot effect the uncoupling operation by the operation of the uncoupling switch or button 52 because the circuit thus closed would still be open on account of the failure of the switch 71 to be operated should the main valve remain open.

In addition to the previously described electrical circuits for operating the main valve controlling magnet from the batteries Y, I show means in the wiring diagram of Fig. 1 for taking the current from the trolley or another exterior source of current supply.

When it is desired to use the trolley current or other exterior source of current supply the switches 60 are disconnected, breaking the battery circuit, and for testing signal lights 70 the switches 72 may be shifted to connect with the terminals 90 which are in circuit with the trolley indicated by the reference character 91, 92 indicating a suitable resistance which may be interposed in series in the circuit if it is desired to use lamps of a low voltage which would be capable of being operated either from the battery or from current supplied from the trolley.

If current be taken from the trolley the switches 60 being thrown to disconnect the batteries in the circuit, the circuit upon the operation of the on button 51 in either of the cars, would be as follows: from the power station through the line to trolley 91 through resistance 92. In order to connect the trolley on circuit I show in the circuits (Fig. 1) connecting lines 93 connecting the trolley current with the line 61 leading to contact 62 of the on switch in the on circuit. The circuit would then be traced through switch 63 and line 64 to the on magnet operating valve 30; thence through line 65 to the on valve operating magnet in the opposite car; thence through line 64 and through open switch 51 to line 66; thence through line 67 to ground, completing the circuit to the source of current supply for the trolley.

The switch 72 is provided for testing the operation of the main valves after the on switches have been operated. If the main valves are operated upon the moving of the switches 72 to contacts 90 the lamps 70 will be placed in circuit with the trolley as follows: from the power station through the line to trolley 91, through resistance 92, switch 72 and line 73 to lamp 70; thence through line 74, switch 71 and line 75 to the coupler 18; thence through line 75 on the opposite car and switch 71 to line 74 and lamp 70; thence through line 73 and switch 72 to line 71ª through line 66 and line 67 to ground and the power house. From this it will be seen that the shifting of the switches 72 to the contacts 90 in the trolley circuit of either car may be utilized at any time to throw the light 70 in circuit by the operation of the switch 72 to the binding post 90 of the trolley circuit whether the connection 92 be used for connecting the trolley circuit with the circuit for operating the main valves or not. Also it will be apparent that when the circuit is thus closed by the shifting of one or the other of the switches 72 the light 70 will light if the main valves have operated.

Figure 4:
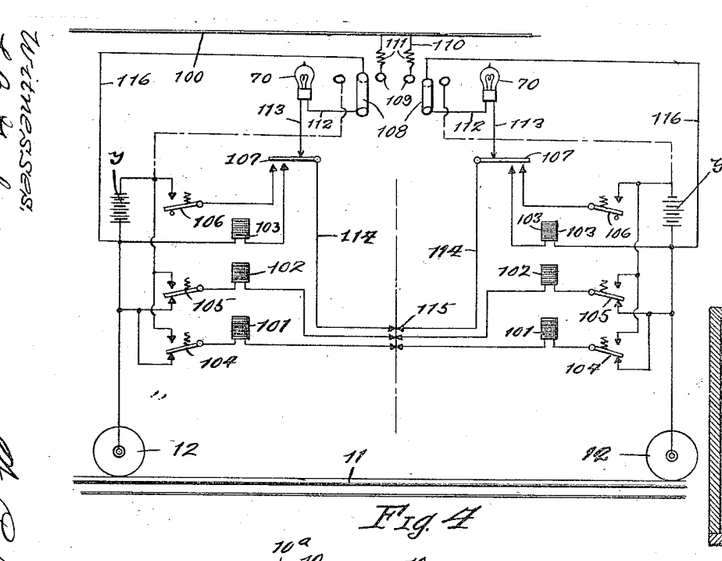
Fig. 4 is a detail view showing a modified form of wiring diagram of the various electrical circuits as an alternative form to be used in connection with the embodiment of the invention illustrated herein.

In Fig. 4 I show a modified wiring diagram. By this arrangement of the electric circuits the operator has a double check on the signal lights; that is, if he closes the switch in either car to close the battery circuit and finds that the signal lights fail to operate he can, with this arrangement of wiring shown in Fig. 4, throw the switch over to the trolley circuit which will give him a double check on the action of the lines, for it will be apparent that although the main valves may have been operated from the trolley current if reliance were placed wholly upon the batteries for operating the signaling lights their failure to light might be due to a failure of the battery circuit or the batteries themselves rather than the failure of the main valve to operate.

In Fig. 4 the reference character 11 indicates the rail and 12 indicates the wheels of the trucks on two coöperating cars. A trolley wire is indicated by the reference character 100. 101, 102 and 103 indicate the off, on and uncoupling magnets in the order named in the two cars. The off, on and uncoupling switches in each of the cars are indicated by the reference characters 104 to 106 respectively, and the reference character 107 indicates switch levers corresponding to the switches 71 operated by the main valves as shown in Fig. 1. As in Fig. 1 the batteries are indicated by the reference character Y. The reference character 108 indicates three point switches adapted to be held normally in their central position, as indicated in Fig. 1, but capable of being shifted to either of two positions. If the switches 108 be shifted from their neutral position shown in Fig. 4 so that one of them will contact with the trolley contacts indicated by the reference character 109, assuming that an attempt has been made to operate the main valve by closing the on switch 105 in one or other of the cars, the circuit would then be traced as follows through the light: from the trolley wire 100 through the trolley pole or contacting arm 110 provided with resistance, for example at 111, to enable the lights 70 of a voltage suitable for the batteries to be used in the circuit, the current would pass thence through binding post 109 to switch 108, thence through line 112, light 70 and line 113 to switch arm 107, thence through line 114 and coupler devices, as indicated at 115, through line 114 on the companion car and switch 107 to line 113, through lamp 70, thence through line 112 to switch 108 in the neutral position and through line 116 to ground, which would be in circuit with the supply of power to the trolley wire, completing the circuit. Obviously the circuit would be traced through the same corresponding connections regardless of which of the switches 108 be manipulated to take current from the trolley, which would, of course, be governed by the position of the operator with respect to the two coöperating cars. It will be understood that in the form of the invention shown in Fig. 4 the magnets 101 to 103 inclusive, and switches 104 to 106 inclusive, and their operating connections operate in the same manner to control the main valve and its coöperating mechanism as in the form of the invention shown in Fig. 1.

Figure 5:
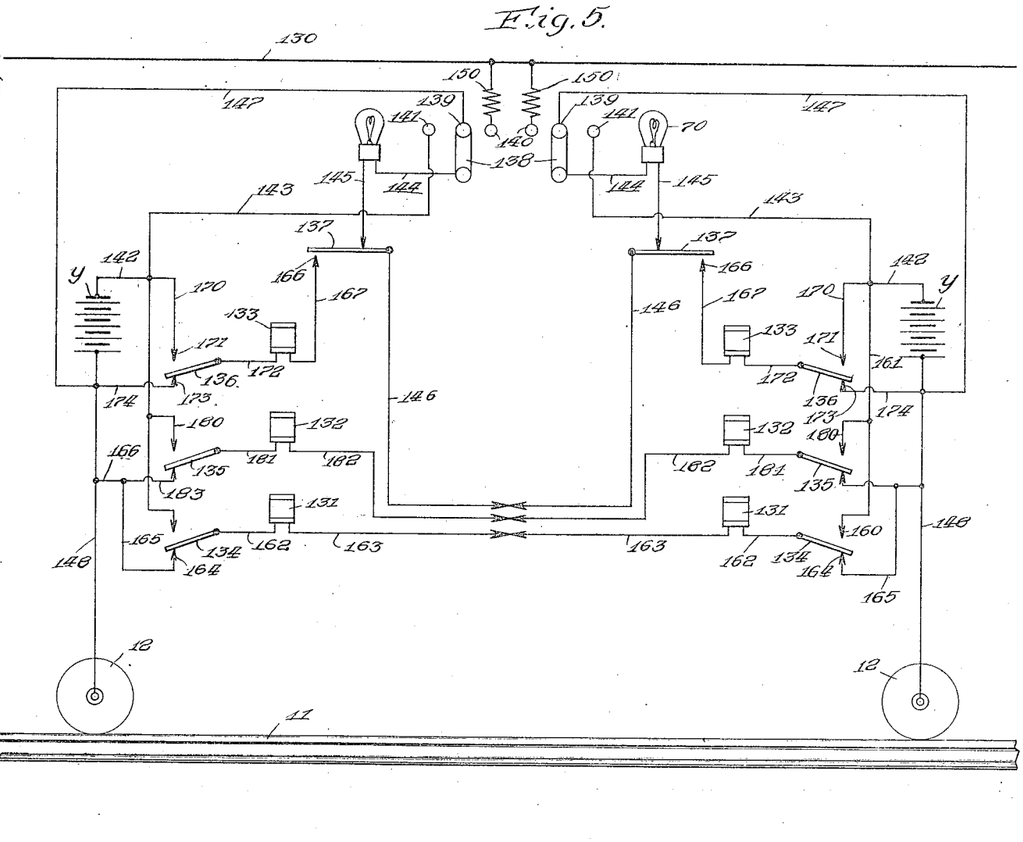
Fig. 5 is an additional view showing a further modification of wiring diagram that has been devised for use in connection with the invention.

In Fig. 5 another modified form of wiring diagram is shown that obviates certain objections that may, under some conditions, be urged against the arrangements of circuits shown in Figs. 1 and 4 respectively.

In Fig. 5, as in the other figures, the reference character 11 indicates the rail and 12 the wheels of the trucks on two coöperating cars. A trolley wire is also indicated by the reference character 130, and the reference characters 131, 132, and 133 indicate the off, on and uncoupling magnets in the order named in the two cars. The off, on and uncoupling switches in the order named are indicated in each of the cars by the reference characters 134 to 136 respectively and the reference character 137 indicates the switch levers operated by the movement of the main valves like the switch levers 107 of Fig. 4, or the switches 71 of Fig. 1. As in the other figures the batteries are indicated by the reference character Y. The reference character 138 indicates three point switches in each of the cars adapted to be held normally by elastic or other suitable means not herein shown in their central positions as indicated in Fig. 5, but at the same time being capable of being operated to either of two other positions. In their central positions as indicated in Fig. 5, the switches 138 connect with the contacts indicated at 139. It will be seen that the switches 138 provide means for throwing the lamps 70 in circuit with the trolley or the battery at the option of the operator accordingly as the switch arms 138 are shifted either to the trolley contacts 140 or to the battery contacts 141.

The operation of the signal circuits in testing out the movement of the main valve to the on or coupling position would be as follows: assuming that an attempt has been made to open the main valve in the manner already described, the operator could test the operation of the main valve to the on position, that is determine whether the main valve is moved to the on or open position by shifting a lever 138 in one of the cars to the battery terminal 141 for example. The circuit through the lights 70 under this condition of test would be as follows: out one side of battery Y, over lines 142 and 143, to either of the terminals 141, thence through closed switch in contact with said terminal 138, thence through line 144, through lamp 70, line 145, switch 137 which will be in the elevated position when the main valve is moved to the open position; thence through line 146 and through the car coupler devices to the line 146 on the opposite car, thence through switch lever 137, line 145, lamp 70, line 144 and switch lever 138 which on the opposite car will be in its normal central position in contact with terminal 139 of line 147; thence shunting battery Y on this companion car the circuit will be traced downwardly through line 148 to the opposite side of the battery Y in the car in which the test is being made. Obviously if the main valve in either car has failed to operate for any reason to the open position to elevate the switch levers 137, the circuit which is described will remain open and the light 70 will not be illuminated thus indicating to the operator that the main valves have not properly operated and hence the cars are not in proper coupling relation for normal operation. If the operator desires to test out the signal lights to determine the operation of the main valves on the trolley circuits, he would move the testing lever 138 in either car to a position in contact with trolley terminal 140 and the circuit would be traced as follows: the circuit from the power house through trolley 130 would pass downwardly through the line having the resistance indicated at 150, through contact 140, switch lever 138, line 144, lamp 70, line 145, lever 137, line 146, through the car coupler connections to line 146 on the companion car; thence through lever 147, line 145 and lamp 70 in the opposite car; thence through line 144, switch 138, line 147 and line 148 to ground which would complete the circuit to the power station in circuit with trolley 130. It is believed that the functions of the remaining circuits of the wiring diagram of Fig. 5 will be apparent from the previous description relating to the wiring diagrams of Figs. 1 and 4, keeping in mind that prior to the operation of the uncoupling magnets 133 by the closing of their circuits, it is always necessary, as before described, to operate the main valves to the off position, which is done by energizing magnets 131 in series in the off magnet circuit. The operation of the off and uncoupling circuits previously described, is as follows: the main valves being in the on position and the cars in coupling relation, when it is desired to uncouple, the operator from his position in either of the two coöperating cars will elevate switch lever 134 to contact with its upper coöperating terminal 160, whereupon the circuit containing the off magnets in series may be traced as follows: out of one side of the battery Y, through line 142, thence through line 161, through terminal 160 and switch 134, thence through line 162, off magnet 131, line 163, through the coupler devices connecting the two cars, thence through corresponding line 163 on the opposite car, through off magnet 131, line 162, switch lever 134, in open position, to terminal 164 on line 165, thence through lines 166 and 148 to ground, thence through line 148 on the original car to the opposite side of battery Y. Thus it will be seen that in the off circuit both the off magnets are in series and both the main valves should be shifted to the off position under the control of their respective magnets 131 when this circuit is energized from the battery in either car by the closing of the switch 134 in that car.

One of the important features of the wiring diagram shown in Fig. 5 resides in the placing of the uncoupling magnets 133 in series and therefore one cannot operate unless the other operates also. It will be apparent with regard to the uncoupling circuits in which the magnets 133 are in series, that before this circuit can be closed by the operation of either of the switch levers 136, the main valves must be moved to the off position to cause the lowering of the switch levers 137 controlled by the main valve, else the uncoupling circuit will not be closed.

Assuming that the main valve has been operated to the off position, since the levers 137 operate like the levers 71 of Fig. 1 it will be seen that each of levers 137 will be permitted to drop by gravity until their contact with the terminal of lines 145 is broken and contact is made at 166 with lines 167 leading to the uncoupling magnets 133, this being the normal result of the closing of the circuits containing the off magnets 131 as described. With the main valves operated to the off position, the mechanism is in condition for operating the coupling mechanism to the uncoupled position by closing the uncoupling circuit to energize the uncoupling magnets 133 and upon the closing of switch levers 136 in either of the companion cars the closed circuit may be traced as follows; beginning at the upper side of battery Y in either of the cars, through lines 142 and 170 to contact 171; thence through elevated switch lever 136 connected therewith and line 172 to magnet 133; thence through line 167 and depressed switch lever 137 to line 146, and through the car coupler devices; thence through line 146 on the companion car and depressed switch lever 137 to contact 166, through line 167 and magnet 133, through line 172 and depressed switch lever 136 to contact 173 and through line 174 to line 148 and ground; thence through line 148 on the original car to the opposite side of battery Y.

The circuit containing the on magnets 132 is operated as follows: the movement of either on switch lever 135 into contact with the terminal of line 180 will close the circuit with both magnets 132 in series, the circuit being traced as follows: from battery Y in either car, through lines 142 and 161, through line 180 and closed switch arm 135, to line 181 and magnet 132; thence through line 182 to the coupling devices; thence through line 182 on the companion car to magnet 132, line 181, depressed switch lever 135 and line 183 to line 166; thence through line 148 to ground and through line 148 on the original car to the opposite side of battery Y.

In order that the invention might be understood the details of the embodiment preferred by me have been set forth, but it is not desired to be limited to this specific structure, for it will be apparent that persons skilled in the art may resort to various modifications and arrangement of the parts without departing from the purpose and spirit of the invention:

I claim:

1. In a combined car, air and electric coupling, pipe lines joined through the car coupling, valves in each car therefor, separate electro-pneumatic means in each car for opening and for closing said valves and electrically connected through said car coupler, and electrical controlling means in each car for operating either the said valve opening means or the valve closing means in both cars at the same time.

2. A combined car, air and electric coupling, comprising a pipe line connected through the car coupler, a valve in each car for said pipe line, separate electro-pneumatic means in each car for opening and closing said valve, separate electrical controlling means in each car for simultaneously actuating either the valve opening or the valve closing means in both cars, and an independent signal in each car visible from the other car and depending upon the position of the valve.

3. In a car, air and electric coupling, pipe lines joined when the cars are coupled, a valve in each car for each pipe line, means in each car to open or close the valves at the same time, separate electro-responsive means to control the opening and the closing operation of said means, and electric connections in both cars joined through the car couplers and including switches in each car, one for operating the electro-responsive means in both cars to open said means, and the other to close said means.

4. In a combined car, air and electric coupling system for cars, the combination with a car coupler engageable upon impact with a counterpart coupler, of air and electric connection thereby made between the couplers, electro-pneumatic means for uncoupling the car coupler, main air closing valves for each coupler, electro-responsive means separately operable for opening and closing the valves, and a separately operable switch in each car for the said valve opening and closing means and for the said electro-pneumatic coupling means, the valve switches for the valve opening and valve closing means also closing circuits through the car couplers with the corresponding devices of the adjacent coupler.

5. In a car, air, and electric coupling system for cars, the combination with main air line valves, of separate electroresponsive means for opening and for closing the said valves of each coupler, pneumatic uncoupling means for each car coupler, an electro-responsive device for directly controlling said uncoupling means, and electric circuit closing means operated by said main valves to close a connection to said device only when the main valves are closed thereby forming an interlock to prevent uncoupling before the main valves are closed.

6. In a car, air, and electric coupling system for cars, the combination with main air line valves, of separate electroresponsive means for opening and for closing the said valves of each coupler, pneumatic uncoupling means for each car coupler, an electro-responsive device for controlling said uncoupling means, circuit closing means operated by said main valves when in closed position to complete a single connection to said device, means to thereafter complete an energizing circuit through the connection to said devices, other circuit closing means operated by said main valves when in open position, and a lamp in said circuit which is a visible indication of the position of the main valves.

7. In a combined car, air, and electric coupling system, the combination with main air closing valves for each coupler, of electroresponsive means for opening and for closing said valves, electroresponsive car uncoupling means, and separate circuit closing means for each of the said electroresponsive means to operate the said valve opening means and valve closing means independently of the uncoupling means.

8. In a combined car, air, and electric coupling system, the combination with a car coupler engageable upon impact with a similar coupler, of pneumatic means for disengaging the car coupler, main air closing valves for each coupler, electroresponsive means separately operable for opening and closing the valves, and separately operable electroresponsive means for controlling the said pneumatic device for uncoupling the car coupler when the valves are closed.

In testimony whereof I have signed my name to this specification, in the presence of two subscribing witnesses, on this 7th day of January A. D. 1915.

WILLIAM P. BOVARD

Witnesses:
JNO. L. YOUNG,
REX G. AVERILL.